United States Patent [19]

Smith et al.

[11] 4,414,101
[45] Nov. 8, 1983

[54] HYDROCARBON CONVERSION METHOD AND APPARATUS

[75] Inventors: Jeffrey S. Smith, League, Tex.; George P. Quinn, Clarendon Hills; Iacovos A. Vasalos, Downers Grove, both of Ill.

[73] Assignee: Standard Oil Company (Indiana), Chicago, Ill.

[21] Appl. No.: 293,693

[22] Filed: Aug. 17, 1981

[51] Int. Cl.³ .......................................... G10G 35/00
[52] U.S. Cl. ........................................ 208/153; 208/113
[58] Field of Search ...................... 208/153, 113, 164; 422/145, 144, 142, 141

[56] References Cited

U.S. PATENT DOCUMENTS

| | | | |
|---|---|---|---|
| 2,908,630 | 10/1959 | Friedman | 208/153 X |
| 2,913,392 | 11/1959 | Ricards | 422/144 X |
| 3,186,805 | 6/1965 | Gomory | 208/153 X |
| 3,639,228 | 2/1972 | Carr et al. | 208/153 |
| 4,234,411 | 11/1980 | Thompson | 208/153 X |
| 4,257,875 | 3/1981 | Lengemann et al. | 208/113 |

Primary Examiner—Delbert E. Gantz
Assistant Examiner—Glenn A. Caldarola
Attorney, Agent, or Firm—James R. Henes; William T. McClain; William H. Magidson

[57] ABSTRACT

A method and apparatus for regulating the intensity of the catalytic conversion of hydrocarbons in a conversion system employing a transfer line reactor are disclosed.

9 Claims, 3 Drawing Figures

HYDROCARBON CONVERSION METHOD AND APPARATUS

BACKGROUND OF THE INVENTION

This invention relates generally to a method and apparatus for regulating the intensity of the catalytic conversion of hydrocarbons and more particularly concerns a method and apparatus for regulating the severity for the conversion of hydrocarbons in the presence of fluidized catalyst particles in a conversion system employing a transfer line reactor.

As a result of the development of catalysts of improved activity, numerous catalyzed hydrocarbon conversion processes can be performed in a transfer line reactor. Such catalysts make possible the utilization of previously recognized advantages of the dilute-phase transport reactor, commonly known as the transfer line or riser reactor. Transfer line reactors have found wide usage in numerous hydrocarbon conversion processes, including in particular the catalytic cracking of hydrocarbons. While the process and the apparatus of the present invention are useful in a wide range of catalytic hydrocarbon conversion processes that can be performed in a transfer line reactor, the present invention will be described hereinafter with particular reference to its application to the catalytic cracking of hydrocarbons.

Transfer line fluid catalytic cracking is a mode of fluid catalytic cracking of hydrocarbons in which finely divided cracking catalyst particles are formed into a suspension with a hydrocarbon feed which substantially is in the vapor phase. In a typical embodiment of transfer line cracking, the suspension flows at a gas velocity in the range between about 15 and 75 feet per second through an elongated reaction zone having a length-to-diameter ratio in the range of from about 10:1 to about 50:1, and the weight ratio of feed per hour to catalyst in the reaction zone is in the range of from about 20:1 to about 300:1. The density of cracking catalyst particles in a typical transfer line or riser fluid catalytic cracking reactor ranges from 1.0 to 10.0 pounds per cubic foot.

Transfer line cracking reactors are increasingly of interest to refiners generally because they feature short residence timers for oil and catalyst which enable active catalyst particles to provide high conversions of cracking feed to hydrocarbons boiling in the gasoline boiling range without excessive overcracking of desirable products. Transfer line reactors are also characterized by good mixing of feed and catalyst and by a lower system catalyst inventory due to more efficient use of the catalyst. Furthermore, the hydrocarbon effluent from a transfer line reactor can be quickly separated from the catalyst so as to avoid excessive conversion of the hydrocarbon conversion product—for example, aftercracking—in a dense bed or even a dilute phase over a dense bed.

In modern refinery practice, it is necessary that the catalytic cracker have maximum flexibility to enable the refiner to adjust product yields and quality and quantity in response to changes in demand. In the development of the fluid catalytic cracking process, it has been recognized that certain feedstocks are more refractory than certain other feedstocks. The more refractory stocks are usually cracked under more severe conditions than the less refractory stocks. In a hydrocarbon conversion process which is performed in a dense fluid-bed reactor system, the reaction severity or the extent of conversion of the hydrocarbon feedstock generally is a function of space velocity which is a measure of the amount of catalyst seen by the oil and the length of time during which the catalyst and oil are in contact. Historically, the space velocity requirement has been accommodated by designing for adequate catalyst inventory in the reactor. Seasonal variations in conversion requirements were met by adjusting the catalyst level in the dense-bed reactor.

Although the need for such flexibility still exists in a system employing a transfer line reactor, the capability of adjusting the catalyst level to enhance the space velocity flexibility as with the dense-bed does not exist with a conventional transfer line reactor. Various apparatus configurations in systems employing a transfer line reactor have been proposed in order to obtain different optimum conversion conditions for feeds of different physical properties. One approach to vary the severity of cracking has been to vary the contact times of feeds having different cracking characteristics with cracking catalysts so that each feed is cracked under process conditions which are optimum for its own cracking characteristics. Typically in conventional systems employing transfer line cracking, more severe cracking conditions can be obtained for the purpose of cracking a more refractory feed by charging the more refractory feed to the transfer line reactor at a point in the transfer line reactor further upstream than the point where a less refractory feed would be charged. Representative systems are disclosed in Woertz, U.S. Pat. No. 2,890,164; Hennig, U.S. Pat. No. 3,065,166; Bryson et al., U.S. Pat. No. 3,617,497; Dober et al., U.S. Pat. No. 3,654,137; Saxton, U.S. Pat. No. 3,671,424; McKinney et al., U.S. Pat. No. 3,692,667; Schwartz et al., U.S. Pat. No. 3,847,793; Strother, U.S. Pat. Nos. 3,948,757 and 4,051,013; and Gross et al., U.S. Pat. No. 4,218,306.

For example, Woertz and Hennig disclose a method in which two feeds, one more and the other less refractory, are charged to a transfer line reactor, with the more refractory feed being charged separately to the transfer line and sufficiently far upstream from the point at which the less refractory feed is charged to the transfer line. This technique permits substantial cracking of the more refractory feed to occur between the points of feed entry. Advantage is thereby taken of the higher temperature and activity of the freshly regenerated catalyst particles further upstream in the transfer line closer to the regenerator where the more refractory feed is introduced than downstream where the less refractory feed is introduced and of the longer contact time of catalyst with the more refractory feed than with the less refractory feed.

An analogous technique involving multiple catalyst injection to a transfer line reactor in order to increase the yield and selectivity of the cracking reaction to gasoline is disclosed in Carr et al., U.S. Pat. No. 3,639,228. Carr et al. disclose a fluid catalytic cracking system employing a transfer line reactor having a short residence time in which only a portion of the fresh or freshly regenerated catalyst which is used is charged to the inlet of the reactor together with the hydrocarbon feed and the remainder of the freshly regenerated catalyst is charged downstream from the transfer line reactor.

Each of these techniques requires (1) injection of either catalyst or oil at a point downstream from the inlet to a transfer line reactor and into an accelerated fluidized mixture moving within the transfer line reactor and (2) injection of a more refractory feed into the transfer line reactor at a point substantially upstream of the point where the less refractory may feed is to be injected. However, such requirements pose major problems to the practical operation of a typical transfer line reactor. First, introduction of either hydrocarbon or catalyst at a point downstream from the inlet to the transfer line reactor into a suspension therein moving at a velocity of 20-60 feet per second can cause a serious pressure imbalance in the system. Secondly, a system requiring introduction of feed at a point substantially upstream of the point where a second feed is to be introduced may necessitate the use of a transfer line reactor which is significantly longer than what is conventionally employed.

Catalytic cracking systems in which combinations of a transfer line reactor and a fluidized bed reactor have been employed to effect different cracking conditions for feeds having different cracking characteristics have also been reported. Typical such combinations are disclosed in Owen, U.S. Pat. No. 3,671,424 and Bunn et al., U.S. Pat. No. 3,784,360. For example, Owen discloses a modification of a fluidized bed catalytic cracker which permits at least a portion of the feed to the cracking reactor to be reacted in a dilute catalyst phase rather than the fluidized bed and at a temperature substantially different from that of the fluidized bed. This is accomplished by dividing the riser conduit into two separate and parallel conduits with one of these conduits having its outlet above the fluidized bed of the reactor and the other having its outlet within the fluidized bed of the reactor. The method thus makes possible the cracking of two different feedstocks simultaneously in a conventional fluidized bed catalytic cracker under different conditions of temperature and catalyst-to-oil ratios. However, any such reported combination in which the effluent from a transfer line reactor is passed into a conventional fluidized bed reactor, eliminates the aforesaid advantage of a transfer line reactor of permitting a quick separation of hydrocarbons from catalyst particles in the effluent and thereby minimizing aftercracking.

OBJECTS OF THE INVENTION

It is therefore a general object of the present invention to provide a method and apparatus for regulating the severity of the catalytic conversion of hydrocarbons in a system employing a combination of a transfer line reactor and a fluidized bed reactor which overcomes the problems of the aforesaid prior art methods.

More particularly, it is an object of the present invention to provide a method and apparatus for regulating the severity for the catalytic conversion of hydrocarbons in a system employing a combination of a transfer line reactor and a fluidized bed reactor which permits the use of a transfer line reactor of conventional length and a quick separation of catalyst and hydrocarbons in the effluent from the transfer line reactor.

It is a related object of the present invention to provide a method and apparatus which affords flexibility in maintaining optimum severity levels for each of a plurality of different feeds.

Other objects and advantages of the invention will become apparent upon reading the following detailed description and appended claims and upon reference to the accompanying drawings.

SUMMARY OF THE INVENTION

These objects are achieved by an improved apparatus for the cyclic, continuous conversion of a hydrocarbon feedstock in contact with fluidized hydrocarbon conversion catalyst particles, comprising: a reaction zonec comprising a transfer line reactor and wherein the hydrocarbon feedstock is subjected to conversion by contact with fluidized hydrocarbon conversion catalyst particles and catalyst particles are deactivated by deposits formed thereon during the hydrocarbon conversion; a separation zone adapted to receive the effluent from the reaction zone and to separate catalyst particles therefrom; a stripping zone adapted to receive separated catalyst particles from the separation zone effluent and wherein volatile deposits formed on the surface of the catalyst particles during the hydrocarbon conversion in the reaction zone are removed by contact with a stripping gas; and a regeneration zone adapted to receive stripped catalyst particles from the stripping zone effluent and wherein non-volatile deposits formed on the surface of the catalyst particles during the hydrocarbon conversion process in the reaction zone are removed from the catalyst particles to thereby regenerate the catalyst particles and from which regenerated catalyst particles are recirculated to the reaction zone. The improvement in this apparatus comprises (a) the reaction zone comprising a reaction vessel adapted to contain and be substantially completely filled by a dense fluidized bed of catalyst particles and located upstream of the transfer line reactor, the reaction zone further comprising means for introducing into the reaction vessel catalyst particles from the regeneration zone and a fluidizing gas, means for introducing a hydrocarbon feedstock into the reaction vessel and for varying the severity of the hydrocarbon conversion in the reaction vessel, and means for discharging the entire effluent from the reaction vessel into the transfer line reactor; and (b) the separation zone being adapted to receive the effluent from the transfer line reactor and to separate catalyst particles therefrom.

This invention is also an improvement in a process for the cyclic, continuous catalytic conversion of a hydrocarbon feedstock wherein the feedstock is subjected to conversion in contact with fluidized hydrocarbon conversion catalyst particles in a reaction zone comprising a transfer line reactor, catalyst particles which are deactivated by deposits formed thereon during hydrocarbon conversion in the reaction zone are separated from the reaction zone effluent and passed to a stripping zone wherein volatile deposits formed thereon during the hydrocarbon conversion in the reaction zone are removed from the catalyst particles by contact with a stripping gas, stripped catalyst particles are separated from the stripping zone effluent and passed to a catalyst regeneration zone where the non-volatile deposits formed thereon during the hydrocarbon conversion in the reaction zone are removed therefrom to thereby regenerate the catalyst particles, and the regenerated catalyst particles are separated from the regeneration zone effluent gas and recirculated to the reaction zone. The improvement in this process comprises: providing a reaction vessel in the reaction zone and upstream of the transfer line reactor, and a plurality of feed inlets in the reaction zone to permit delivery of the hydrocarbon feed at one of a plurality of points spaced substantially upstream or downstream of one another in the reaction zone, at least one such point being in the reaction vessel;

passing the catalyst particles from the regeneration zone and into the reaction vessel, introducing a fluidizing gas into reaction vessel and maintaining a dense fluidized bed of the catalyst particles in the reaction vessel so as to substantially completely fill the reaction vessel with the dense fluidized bed; introducing the hydrocarbon feedstock into the reaction zone through a predetermined one of the plurality of feed inlets to thereby control the contact time of the hydrocarbon feedstock with the catalyst particles in the reaction zone so as to regulate the reaction severity for the conversion of the hydrocarbon feedstock in the reaction zone, passing the entire effluent from the reaction vessel into the transfer line reactor; and separating the catalyst particles from the effluent from the transfer line reactor and passing the separated catalyst particles to the stripping zone.

BRIEF DESCRIPTION OF THE DRAWINGS

For a more complete understanding of this invention, reference should now be made to the embodiments illustrated in greater detail in the accompanying drawings and described below by way of examples of the invention. In the drawings.

It should be understood that the drawings are not to scale and that the embodiments are illustrated by graphic symbols, phantom lines, diagrammatic representations and fragmentary views. The drawings are shown only in such detail as is necessary for a clear understanding of the invention. In certain instances, details which are not necessary for an understanding of the present invention or which render other details difficult to perceive may have been omitted. It should be understood, of course, that the invention is not intended to be unduly limited by the drawings or to the particular embodiments illustrated herein.

DETAILED DESCRIPTION OF THE INVENTION

The apparatus and method of the present invention provide an added degree of flexibility to catalytic hydrocarbon conversion operations in an existing or grass-roots unit, each comprising a transfer line reactor. For example, in such units for catalytic cracking hydrocarbons, the present invention affords flexibility by permitting hydrocarbon feeds of widely varying cracking characteristics to be converted to gasoline and/or distillate under widely varying conditions of reaction severity without necessitating the use of duplicate facilities or extensive modification of known apparatus and methods. The present invention permits the range of reaction severities of conversion normally attainable for a particular hydrocarbon feed in a transfer line cracking reactor to be increased by introducing the hydrocarbon feed into a fluidized bed reactor which is located upstream of the transfer line reactor and whose entire effluent is passed directly into the transfer line reactor. Greater reaction severities may be achieved with the apparatus and method of the present invention than in a transfer line cracking reactor of conventional length by reason of the increased concentration of catalyst particles-equivalent to a lower space velocity or increased contact time between the hydrocarbon feed and catalyst particles-in the fluidized bed reactor upstream of the transfer line reactor, before the effluent from the fluidized bed reactor discharges into the transfer line reactor.

The extent of enhancement of the reaction severities attainable for a particular hydrocarbon feed in the apparatus and method of this invention can be regulated by controlling the location in the fluidized bed reactor where the hydrocarbon feed is introduced. The more remote (the farther upstream) from the inlet to the transfer line reactor that the hydrocarbon is introduced into the fluidized bed reactor-that is, the lower in the fluidized bed reactor that the hydrocarbon feed is introduced-the longer the contact time between the feed and the cracking catalyst particles in the fluidized bed before the effluent from the fluidized bed reactor discharges into the transfer line reactor.

For example, alternative inlets for the hydrocarbon feed can be located at different points in the fluidized bed reactor. Thus, even with essentially constant overall rates of introduction of the hydrocarbon feed, catalyst particles and fluidizing gas, and with essentially constant catalyst activity and temperature, the contact time between the hydrocarbon feed and the catalyst particles in the fluidized bed reactor can be varied by varying the distance between the transfer line reactor inlet and the point at which the hydrocarbon feed is introduced into the fluidized bed reactor. Thus, the use of the fluidized bed reactor in the apparatus and method of this invention affords a very substantial increase in the range of reaction severities attainable for a particular hydrocarbon feed over those attainable for the same feed in a conventional transfer line reactor.

It must of course be recognized that the alternative inlets must be spaced sufficiently far apart to achieve the desired differences in contact times and reaction severities. Moreover, baffles in the fluidized bed can assist in maintaining different conditions in different zones of the fluidized bed. For example, provision of a first feed inlet at a point in the fluidized bed reactor which is in close proximity to the inlet to the transfer line reactor and introduction of the feed through such first inlet result in a combined feed-catalyst contact time in the fluidized bed reactor and the transfer line reactor together which is substantially the same as the feed-catalyst contact time in the transfer line reactor alone. In such case, the feed passes substantially directly into the transfer line reactor, and the apparatus of the present invention functions substantially as a conventional transfer line reactor. Furthermore, when the feed is introduced through a line extending through the fluidized bed and terminating at a first feed inlet at or within the inlet of the transfer line reactor, the apparatus of this invention functions exactly as a conventional transfer line reactor. On the other hand, everything else being equal, introduction of the feed through a second feed inlet at a point in the fluidized bed reactor substantially more remote from the inlet to the transfer line reactor than the aforesaid first feed inlet results in a substantially greater feed-catalyst contact time in the fluidized bed reactor and transfer line reactor combined than in the transfer line reactor alone.

Thus, on the one hand, in the present invention the combination of an upstream fluidized bed reactor and a downstream transfer line reactor can be operated as or substantially as a conventional transfer line reactor with all of the aforesaid benefits of conventional transfer line cracking. On the other hand, the combination of an upstream fluidized bed reactor and a downstream transfer line reactor in this invention can be operated so as to substantially augment the range of reaction severities over those in conventional transfer line cracking.

Moreover, not only can a single hydrocarbon feed having a particular set of cracking characteristics be charged to the fluidized bed reactor but also a plurality of feeds differing in their cracking characteristics can be charged to the fluidized bed reactor, with each feed being introduced through a separate inlet in the fluidized bed reactor, or, in the alternative, one of such feeds can be introduced, as indicated above, directly, into or at the inlet of the transfer line reactor. For example, the more refractory of any two of such feeds can be introduced through an inlet which is more remote from the inlet to the transfer line reactor (and hence lower in the fluidized bed reactor), and the less refractory of the two feeds can be introduced through an inlet which is in close proximity to the inlet to the transfer line reactor. Thus, the contact time with the catalyst-and hence the severity of conversion-for a particular feed which is particularly suited to the cracking characteristics of that feed and/or the desired extent of conversion, can be selected. For example, more refractory (that is, harder to convert or react or crack) recycle feeds separated from cracking products are cracked under more severe conditions than virgin stocks. Regardless of the number of such feeds charged to the fluidized bed reactor, the feeds are segregated according to their cracking characteristics, and each segregated feed is charged separately to the fluidized bed reactor and is cracked therein under severity conditions particularly suited to its cracking characteristics. Mixing of the feeds can be minimized, for example, by introducing one feed substantially directly into the transfer line reactor or by the use of baffles in the bed.

When a plurality of segregated feeds having different cracking characteristics are introduced into the fluidized bed reactor of the present invention, the cracking products are allowed to mix. When it is desired to segregate the cracking products of one hydrocarbon feed from the cracking products of a second hydrocarbon feed, parallel transfer line reactors can be employed. A fluidized bed reactor is disposed upstream of one of the transfer line reactors, and either a second fluidized bed reactor is disposed upstream of the second transfer line reactor or a fluidized bed reactor is not used in conjunction with the second transfer line reactor. In such case, one hydrocarbon feed is introduced into one of the parallel reactor assemblies and the second hydrocarbon feed is introduced into the second of the parallel reactor assemblies. As will be illustrated hereinbelow, the use of such parallel reactor assemblies permits the cracking products from one hydrocarbon feed to be segregated from the cracking products from the other hydrocarbon feed.

It is desirable in some circumstances to introduce the catalyst particles through a plurality of separate inlets. For example, if a first hydrocarbon feedstock having a particular set of cracking characteristics is introduced at the bottom of the fluidized bed reactor and a second hydrocarbon feedstock having a different set of cracking characteristics is introduced just below the top of the fluidized bed reactor and if it is desired to maintain a particular total catalyst-to-oil weight ratio in the transfer line reactor, than the first hydrocarbon feedstock may be excessively overcracked in the fluidized bed reactor if all of the catalyst required to maintain such catalyst-to-oil ratio were introduced at the bottom of the fluidized bed reactor. In such a case, it is desirable to introduce only a sufficient amount of catalyst at the bottom of the fluidized bed reactor to produce the desired reaction severity in the fluidized bed reactor and the remainder near the top thereof and in such a way as to minimize mixing with the catalyst particles and hydrocarbon feedstock in the fluidized bed reactor. It may also be desirable to employ such plural catalyst introduction procedure if the activity of the catalyst particles introduced at the bottom of the fluidized bed reactor has decayed to too great an extent as a result of coke formation, before coming in contact with the hydrocarbon stream introduced near the top of the fluidized bed reactor. Mixing of the catalyst particles near the top of the fluidized bed reactor with the suspension in the fluidized bed reactor can be minimized, for example, by directing such catalyst particles substantially directly into the transfer line reactor or by the use of baffles.

Hydrocarbon feed materials of different cracking characteristics which are suitable for use in the apparatus and method of the present invention include distillate, light gas oils, heavy gas oils, naphthas, wide cut gas oils, vacuum gas oils, kerosenes, decanted oils, residual fractions and cycle oils derived from any of these, as well as suitable fractions derived from shale oils, tar sands liquids, coal liquids, synthetic oils and the like. The residual oils, coker gas oils and other materials high in polynuclear aromatics, recycled naphtha product of cracking, and other high boiling recycle products of cracking usually identified as the heavy cycle oil, are especially suitable feeds in the apparatus and method of this invention. In general, all of the feeds normally cracked in a transfer line reactor as well as feeds containing high boiling materials such as asphaltenes and feeds usually regarded as too refractory to be effectively or conveniently cracked in a conventional transfer line reactor are particularly suitable feeds in the apparatus and method of this invention.

Any conventional cracking catalyst which is capable of fluidization and which has sufficiently high activity and selectivity for the production of gasoline and/or distillate cracking products from a gas oil in a conventional transfer line reactor under conventional transfer line cracking conditions is suitable for use in the method and apparatus of the present invention. Suitable catalysts include high alumina content amorphous catalysts or catalysts containing a molecular sieve component such as a naturally occurring or synthetic crystalline aluminosilicate, preferably suspended in and distributed throughout an inorganic oxide matrix. Suitable crystalline aluminosilicates include mordenite, chabazite, faujasite and ferrierite. The exchangeable metal cations of the crystalline aluminosilicate, if used, can be present or can be replaced or cation-exchanged with any suitable cation, such as an alkaline earth metal, a rare earth metal, hydrogen or a hydrogen precursor. The molecular sieve component is preferably at a level of from about 0.5 to about 50 weight percent in the cracking catalyst. The matrix of a crystalline aluminosilicate-containing cracking catalyst is typically silica, alumina, thoria or boria and preferably is silica-alumina containing from about 10 to about 70 weight percent of alumina and from about 30 to about 90 weight percent of silica. In addition, the cracking catalyst can contain any component(s) used to promote the combustion of carbon monoxide, the reduction of sulfur oxide emissions and/or the passivation of metal contaminants on the catalyst.

The dimensions of the transfer line reactor employed in the apparatus and method of the present invention are those of conventional transfer line reactors. The ratio of length-to-average inside diameter of the transfer line reactor is in the range of from about 10:1 to about 50:1. Typically the inside diameter of the transfer line reactor is between about 1 foot and 8 feet. The operating conditions employed in the transfer line reactor in the apparatus and method of the present invention are those conventionally used in transfer line cracking. Cracking is effected in the transfer line reactor at temperatures ranging from about 450° C. to about 650° C. The exit temperature of the transfer line reactor is maintained in the range of from about 420° C. to about 590° C. The fluidizing gas is typically steam. The superficial gas velocity in the transfer line reactor ranges from about 10 to about 100 feet per second so that the suspended solids flow at a velocity in the range of from about 5 to about 50 feet per second. The weight ratio of cracking catalyst-to-oil entering the transfer line reactor is typically within the range of from about 3 to about 20 so that the fluidized dispersion will have a density within the range of from about 1 to about 10 pounds per cubic foot. The weight hourly space velocity in the transfer line reactor is in the range of from about 20 to about 300 pounds of hydrocarbon feed per hour per pound of catalyst in the transfer line reactor. Under these conditions, including provision for a rapid separation of catalyst from the effluent from the transfer line reactor, a very short period of contact time between the catalyst and hydrocarbons in the transfer line reactor can be maintained. Contact time within the transfer line reactor generally is in the range of from about 1 to about 10 seconds.

Since the fluidized bed reactor of the apparatus and method of this invention is disposed immediately upstream of the transfer line reactor, and since the entire effluent from the fluidized bed reactor is passed directly into the transfer line reactor, the operating conditions employed in the dense fluidized bed in the fluidized bed reactor have an effect on the operating conditions in the transfer line reactor and must not be inconsistent with the aforesaid desired operating conditions in the transfer line reactor. For example, in one catalytic cracking system of a transfer line reactor extending substantially vertically upward from a fluidized bed reactor, the transfer line reactor has a length of 75 feet and a diameter of 42 inches, and the fluidized bed reactor has a length of 20 feet and a diameter of 10 feet, and 30,000 barrels per day of a hydrocarbon stream are cracked therein. The diameter of the fluidized bed is usually and preferably greater than the diameter of the transfer line reactor. Cracking is effected in the fluidized bed reactor at temperatures ranging from about 420° C. to about 650° C. The fluidizing gas is typically steam. The fluidizing gas velocity in the fluidized bed reactor ranges from about 0.1 to about 1.0 foot per second. The weight ratio of cracking catalyst-to-oil entering the fluidized bed is within the range of from about 3 to about 20. The density of the catalyst bed is within the range of from 12, preferably 14, to about 50 pounds per cubic foot. The weight hourly space velocity in the fluidized bed reactor is in the range of from about 5 to about 50 pounds of hydrocarbon feed per hour per pound of catalyst in the fluidized bed reactor. Contact time within the fluidized bed reactor generally is in the range of from about 0 to about 100 seconds.

The apparatus, techniques and operating conditions employed in separating the catalyst from the transfer line reactor effluent, recovering hydrocarbon product, passing the separated catalyst to a stripping zone wherein volatile deposits are removed from the catalyst particles by contact with the stripping gas, separating stripped catalyst particles from the stripping zone effluent and passing them to a catalyst regeneration zone where the catalyst particles are regenerated by burning the non-volatile deposits therefrom with an oxygen-containing gas and separating the resulting regenerated catalyst particles from the regeneration zone effluent gas and recycling them to the reaction zone are conventional.

Figure 1:
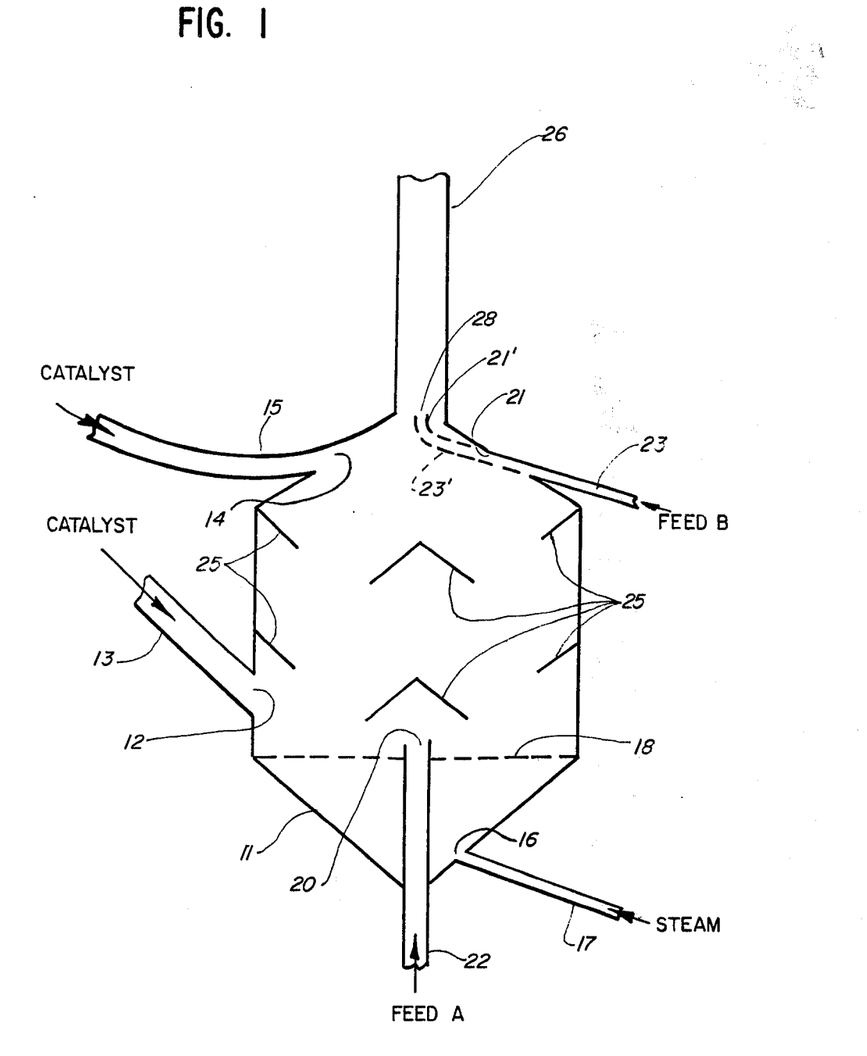
FIG. 1 is a schematic representation of a reaction vessel substantially filled with a fluidized bed of catalyst particles and upstream of a transfer line reactor as a portion of one embodiment of the present invention wherein at least one hydrocarbon feedstock is introduced through one or more of a plurality of separate inlet ports in the reaction vessel in order to provide contact between the feedstock and catalyst in the fluidized bed before the feedstock and catalyst enter the transfer line reactor and to control the contact time therebetween, and optionally wherein another hydrocarbon feedstock is introduced near or directly into the inlet of the transfer line reactor.
Figure 2:
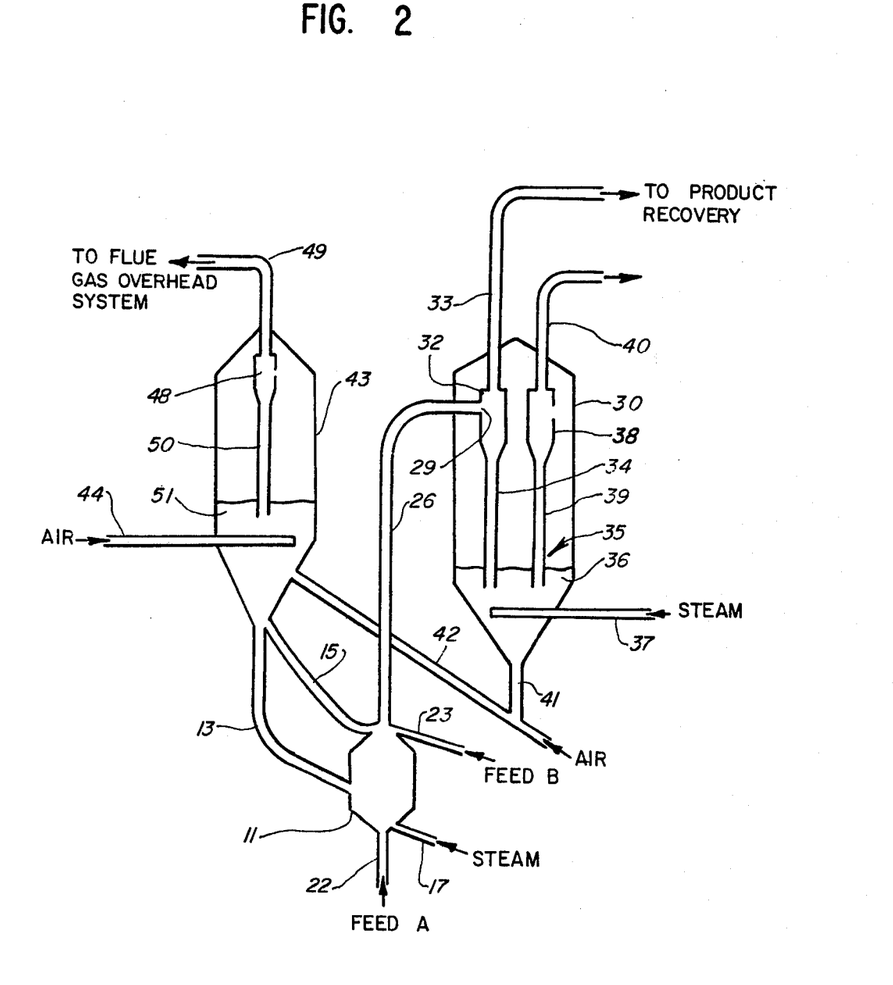
FIG. 2 is a schematic representation of one embodiment of the apparatus of the present invention illustrating the combination illustrated in FIG. 1 of the reaction vessel containing a fluidized bed of catalyst particles and the transfer line reactor, in conjunction with a cyclone system for separation of the hydrocarbon conversion product and deactivated catalyst, a zone for stripping volatile materials from the separated catalyst and a zone for regenerating the stripped catalyst.

Referring now to FIGS. 1 and 2 together, one embodiment of the apparatus of this invention employed in the cyclic, continuous, catalytic method of this invention for cracking a hydrocarbon feedstock comprises a reaction vessel 11 comprising a catalyst inlet 12 through which freshly regenerated cracking catalyst particles are introduced via line 13 to the vessel 11. An additional catalyst inlet 14 through which catalyst particles may also be introduced via line 15 to the vessel 11 is also provided. Inlet 16 is provided for introduction from line 17 of a gas, preferably steam, for fluidizing the cracking catalyst particles. The rates of introduction of catalyst particles and fluidizing gas to the vessel 11 are such as to maintain a fluidized bed (not shown) of catalyst particles in the vessel 11 which substantially completely fills the vessel 11. A conventional gas distribution grid 18 is employed to aid in providing a uniform distribution of steam from the line 17 through the fluidized bed in the vessel 11, to form a base for the fluidized bed and to reduce slugging of solids flow through the vessel 11.

Inlets 20 and 21 are provided for the introduction of hydrocarbon feed(s) and optionally a fluidizing gas such as steam through the lines 22 and 23, respectively. In some circumstances a feed is introduced through only one of the inlets 20 or 21 and only a fluidizing gas is introduced through the other of the inlets 20 and 21. In the specific embodiment illustrated in FIGS. 1 and 2, a hydrocarbon feed at least 80 weight percent of which comprises the naphtha product of catalytic cracking of a petroleum oil, is introduced into the reaction vessel 11 via the line 22 and through the inlet 20, and catalyst is introduced into the reaction vessel 11 via the line 13 and through the inlet 12 and small streams of steam pass through the inlets 14 and 21 only to prevent the lines 15 and 23 from being plugged.

If desired or if necessary, additional fluidizing gas can be introduced at a point or points (not shown) higher in the reaction vessel 11 to supplement the gas velocity to aid in transferring the catalyst particles, unreacted hydrocarbon feed and hydrocarbon product into and through the transfer line reactor 26 as a fluidized suspension.

In other cases, a plurality of hydrocarbon feeds A and B differing in their cracking characteristics are introduced separately into the vessel 11 through the inlets 20 and 21, respectively. In such cases the more refractory of two such feeds is introduced through the inlet port lower in the vessel 11 while the less refractory of the two feeds is introduced through the inlet port higher in the vessel 11. Regardless of the identity and/or number of the inlets employed for the introduction of hydrocarbon feeds and regardless of the type or number of hydrocarbon feeds introduced into the reaction vessel 11, each hydrocarbon feed introduced into the vessel 11 is admixed therein with catalyst particles and the cracking reaction commences therein. Baffles 25 are provided to inhibit mixing between the various hydrocarbon feeds introduced into the vessel 11 and to inhibit mixing between the suspension in the vessel 11 and the catalyst particles introduced through the inlet 14. Furthermore, inlets 14 and 21 and lines 15 and 23 are configured so as to pass catalyst and Feed B substantially directly into the transfer line 26. In addition, the line 23 could be extended, as shown by the broken lines 23', through the fluidized bed so as to discharge a feed through the inlet 21' located directly at or within the inlet 28 of the transfer line reactor 26.

The fluidized mixture of catalyst particles in feed passes upwardly through the vessel 11 while catalytic cracking of the feed to valuable hydrocarbon fractions of greater volatility occurs. In the course of the cracking reaction, coke deposits on the catalyst particles. At the top of the vessel 11, the entire mixture of catalyst particles, conversion products and unconverted feed passes from the vessel 11 into a transfer line reactor 26, where conversion of the unconverted feed continues. In the transfer line reactor 26, the fluidized mixture of catalyst particles, conversion products and unconverted feed passes upwardly as a fluidized suspension while catalytic cracking of the unconverted feed to valuable hydrocarbon fraction of greater volatility continues, and in the course of the cracking reaction additional coke deposits on the catalyst particles. The point of introduction of the hydrocarbon feed can be varied so that the distance between such point and the inlet 28 of the transfer line reactor 26 is changed and so that the contact time between the hydrocarbon and catalyst particles, and hence the amount of cracking occurring, in the reaction vessel 11 can be varied from substantially more or substantially less than in the transfer line reactor 26.

At the outlet 29 of the transfer line reactor 26, the mixture of coked catalyst particles, conversion products and unconverted feed passes into a separator 30 where product recovery and catalyst stripping occur. This effluent from the transfer line reactor 26 passes through a cyclone system 32 to separate hydrocarbon effluent from catalyst particles. The hydrocarbon effluent is then passed to a product recovery system (not shown) such as a fractionator or distillation column through line 33. The catalyst particles separated from hydrocarbon in the cyclone system 32 drop downward through a dipleg 34 to a lower stripper section 35 containing a bed 36 of catalyst particles. Steam is introduced into the stripper section 35 through line 37 and a dispersion device (not shown) to remove entrained hydrocarbon in the catalyst and volatile deposits on the catalyst. Entrained catalyst particles are separated from the steam in cyclone system 38 and returned to the bed 36 through the dipleg 39 while the steam is withdrawn through the line 40. The stripped catalyst particles then pass downwardly in line 41 to line 42 where they are carried in a stream of air up to a regenerator 43 where non-volatile coke deposits on the catalyst particles are burned to carbon monoxide and carbon dioxide in the presence of oxygen introduced to the regenerator 43 through line 44 and a dispersion device (not shown). The gases formed in the regeneration process are separated from regenerated catalyst particles in a cyclone system 48 and withdrawn from the regenerator through line 49 to a flue gas overhead system (not shown). The regenerated catalyst particles separated from flue gas in the cyclone system 48 drop downward through a dipleg 50 into a bed 51 of regenerated catalyst particles and are recycled to the reaction vessel 11 via the line 13 and optionally line 15.

Figure 3:
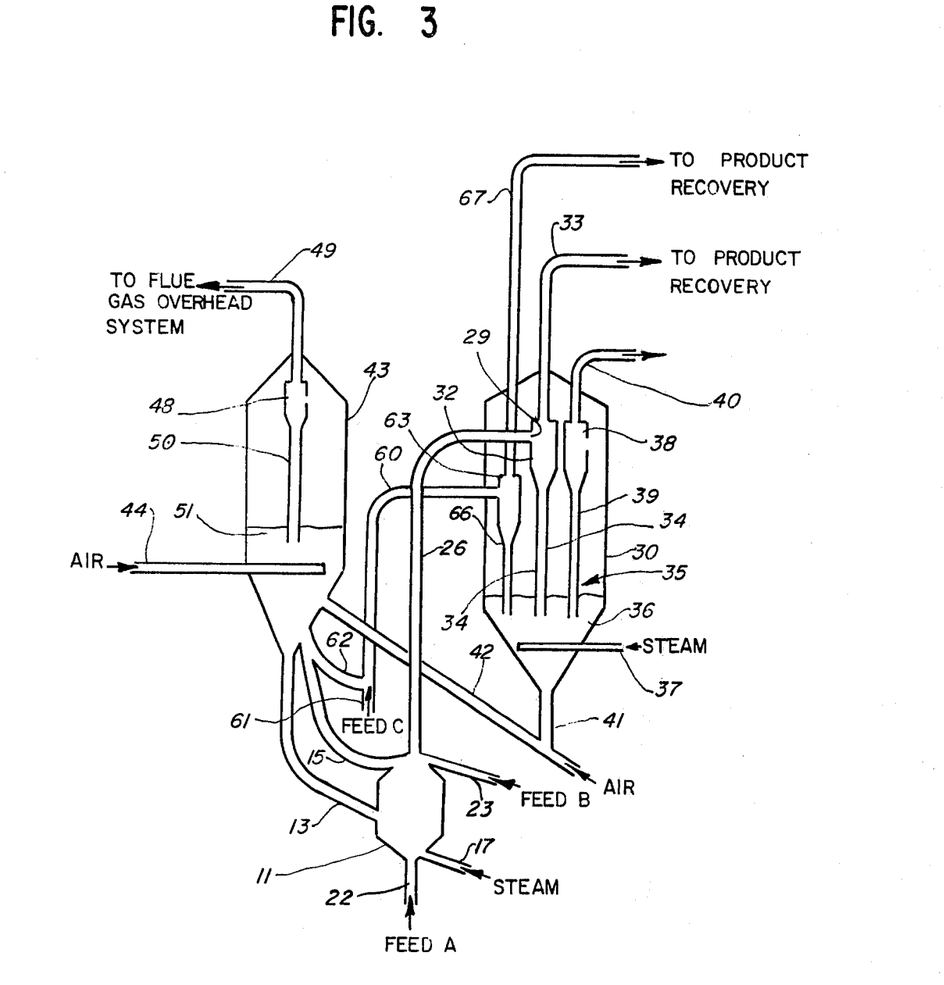
FIG. 3 is a schematic representation of an embodiment similar to that illustrated in FIG. 2 comprising additionally a conventional transfer line reactor with a separate associated cyclone system for separation of the hydrocarbon conversion product and deactivated catalyst from the second transfer line reactor, which permits simultaneous conversion of separate hydrocarbon feedstocks and segregation of the hydrocarbon conversion products.

In the embodiment of FIG. 2, if a plurality of feeds A and B differing in their cracking characteristics are cracked simultaneously in the reaction vessel 11 and the transfer line 26, the cracking products from feeds A and B are combined. In certain cases, however, it may be desirable to separate the cracking products from one feed from the cracking products from another feed. In such instances, a parallel arrangement of transfer line reactors 26 and 60 as shown in FIG. 3 can be employed to segregate the cracking products of Feed C from the cracking products of Feeds A and/or B introduced into the vessel 11. In FIG. 3, Feed C and regenerated catalyst particles are fed via lines 61 and 62, respectively, into the transfer line reactor 60 which discharges its effluent comprising spent catalyst particles, cracking products and unconverted feed hydrocarbons into the separation vessel 30 wherein catalyst particles are separated from the effluent in cyclone system 63 and dropped downward from the cyclone system 63 through dipleg 66 into the bed 36 of catalyst particles in the stripping zone 35. Hydrocarbon product separated in the cyclone system 63 is removed through the line 67. All other parts and functions of the apparatus shown in FIG. 3 are the same and bear the same identifying numbers as the corresponding parts and functions thereof in FIGS. 1 and 2 and are not discussed further here.

The present invention will be more clearly understood from the following specific examples.

EXAMPLES 1-3

A catalytic cracking system, including apparatus, of the type described in Herring, Hinman and Shields, "Automated Catalytic Cracking Pilot Plant," *Chemical Engineering Progress* (Vol. 59, No. 6), pages 38-44, June 1963, was modified to include a reaction vessel substantially completely filled by a fluidized bed of cracking catalyst particles. The reaction vessel was located immediately upstream of the transfer line reactor as illustrated in FIGS. 1-3. The transfer line reactor was about 34 feet long and had an inside diameter of about ⅜-inch. The reaction vessel had an upstream cylindrical section of about 2-inch diameter and 6¾-inch length and a section of about 5-inch length tapering from the cylindrical section downstream to the transfer line reactor. The reaction zone comprising both the reaction vessel and transfer line reactor contained a single injection port for hydrocarbon feed substantially at the center of its base. Cracking catalyst particles and fluidized gas were also introduced into the reaction vessel.

A gas oil feedstock was employed in Example 1, while a West Texas atmospheric resid and a West Texas vacuum resid were employed in Examples 2 and 3, respectively. The properties of each feed are presented in Table I. A commercially available zeolite-containing catalytic cracking catalyst supplied by Filtrol Corporation as F-800 was employed in each of Examples 1-3. The catalyst properties are presented in Table II. In Example 3, unlike in Examples 1 and 2 and contrary to the data in Table II, the activity and coke factor of the catalyst were 100 and 1.60, respectively.

The experimental conditions and results are indicated in Tables III and IV, respectively. As employed in Table IV, severity is obtained by dividing the conversion level by the difference between one hundred and the conversion level. The results in Table IV illustrate that introduction of the feed at the base of the reaction vessel permits the attainment of high levels of conversion and severity with feeds of substantially varying character, especially with feeds having a high boiling range and a high Ramsbottom Carbon Residue or coking tendency, such as the resid feeds.

Of particular relevance to the present invention are the vapor residence times in the fluidized bed and transfer line which are indicated in Table III and the conversion and severity levels indicated in Table IV. These data indicate that, with introduction of the feed at the base of the reaction vessel approximately one-fourth of the total residence time of a vaporized feed in the reaction zone was in the fluidized bed in the reaction vessel and about three-fourths of the total residence time in the reaction zone was in the transfer line.

Injection of a feed through an injection port substantially at the inlet of the transfer line reactor such that the feed would pass directly or almost directly into the transfer line reactor would clearly reduce the residence time of the feed in the fluidized bed in the reaction vessel from the levels therefor shown in Table III to a minimal value, essentially zero. Under these conditions, the portion of the total residence time of the feed in the reaction zone spent in the reaction vessel would be negligible. In such case, the levels of conversion and severity would be considerably reduced from the levels therefor in Table IV, to levels set by cracking essentially in the transfer line alone.

Injection of the feed at some point in the fluidized bed intermediate the base of the reaction vessel and the inlet of the transfer line reactor would clearly result in a residence time in the fluidized bed which would be intermediate zero and the values shown therefor in Table III. Similarly the conversion and severity levels would then also be intermediate the levels shown therefor in Table IV and the levels therefor that would be obtained if the feed were introduced directly into the inlet of the transfer line reactor.

TABLE I

| Feed Properties | | | |
|---|---|---|---|
| Feed | A | B | C |
| Description | gas oil | atm. resid | vac. resid |
| Gravity, °API | 24.1 | 14.6 | 5.9 |
| Pour Point, °F. | 70 | 80 | 115 |
| Viscosity, C$_S$, 210° F. | 4.0 | 33.7 | 1740 |
| 275° F. | — | 12.0 | 240 |
| Elemental Analysis, Wt. % | | | |
| Sulfur | 2.54 | 3.39 | 4.4 |
| Nitrogen | 0.10 | 0.25 | 0.42 |
| Hydrogen | — | 11.08 | 10.08 |
| Carbon | — | 84.77 | 84.30 |
| Composition, Wt. % | | | |
| Oils | — | 50.3 | 23.0 |
| Resins | — | 42.3 | 70.0 |
| Asphaltenes | — | 3.4 | 7 |
| Ramsbottom Carbon Residue | 0.2 | 8.0 | 18.2 |
| Pentane, Insoluble | | 7.3 | 6.95 |
| Hot Heptane, Insoluble | | 3.3 | 7.76 |
| Average Boiling Point | 783 | | |
| Boiling Point Distribution, °F. | | | |
| 430° F. | 0.7 | 1.3 | 0 |
| 430-650° F. | 21.9 | 8.3 | 0.4 |
| 650-750° F. | 18.9 | | |
| 750-850° F. | 21.8 | | |
| 850-950° F. | 23.3 | | |
| 950-1,000° F. | 8.6 | | |
| 650-1,000° F. | | 45.9 | 11.4 |
| 1,000° F.+ | 4.8 | 44.5 | 88.2 |
| Metals Content, ppm. wt. | | | |
| Nickel | 0.2 | 16 | 31 |
| Vanadium | 0.3 | 27 | 58 |
| Iron | 3.0 | 5 | 21 |
| Sodium | — | 8 | 41 |

TABLE II

| Catalyst Properties | |
|---|---|
| Relative Microactivity* | 120.0 |
| Coke Factor | 1.15 |
| Particle Density, g/cc | 1.45 |
| Pore Volume, cc/g | 0.30 |
| Surface Area, m$^2$/g | 75.0 |
| Particle Size, Distribution, Wt. % | |
| 0-20 | 3.6 |
| 20-40 | 14.8 |
| 40-80 | 71.6 |
| 80 | 10.0 |
| Metals Content | |
| Nickel | 185 |
| Vanadium | 135 |
| Iron | 3800 |
| Sodium | 6200 |

*This is approximately twice the value of the Davison microactivity index.

TABLE III

| Conditions | | | |
|---|---|---|---|
| | Example 1 | Example 2 | Example 3 |
| Feed | A | B | C |
| Cracking Conditions | | | |
| Reactor Temperatures, °F. | | | |
| Transfer Line | 960 | 1004 | 955 |
| Fluidized Bed | 965 | 1011 | 956 |
| Catalyst/Oil Wt. Ratio | 16.77 | 14.9 | 16.28 |
| Weight Hourly Space Velocity | 16.4 | 25.4 | 20.8 |
| Vapor Residence Time, sec. | | | |
| Fluidized Bed | 0.7 | 0.6 | 0.5 |
| Transfer Line | 2.2 | 1.9 | 1.6 |
| Total Catalyst Residence Time, sec. | 13 | 10 | 13 |
| Reactor Pressure, psig | 20.0 | 20.0 | 20.0 |
| Transfer line Minimum slip Density, lbs./ft.$^3$ | 2.39 | 2.4 | 1.42 |

TABLE III-continued

| | Conditions | | |
|---|---|---|---|
| | Example 1 | Example 2 | Example 3 |
| Fluidized Bed Density, lbs./ft.$^3$ | 28.6 | 22.9 | 20.6 |
| Transfer Line Holdup, lbs. | .26 | 0.24 | 0.25 |
| Fluidized Bed Holdup, lbs. | .35 | 0.28 | 0.25 |
| Stripping Conditions | | | |
| Temperature, °F. | 963 | 998 | 974 |
| Steam Rate, lbs./ton of catalyst | 29.8 | 25.2 | 36.8 |
| Regeneration Conditions | | | |
| Temperature, °F. | 1065 | 1138 | 1067 |
| Carbon on Regenerated Catalyst, wt. % | 0.10 | 0.01 | 0.10 |

TABLE IV

| | Results | | |
|---|---|---|---|
| | Example 1 | Example 2 | Example 3 |
| Conversion | 77.1 | 74.5 | 74.0 |
| Severity | 3.4 | 2.9 | 2.9 |
| Yield, wt. % | | | |
| hydrogen sulfide | 1.2 | 1.8 | 2.2 |
| hydrogen | 0.1 | 0.2 | 0.1 |
| methane | 0.5 | 1.0 | 1.3 |
| ethylene | 0.7 | 0.5 | 0.8 |
| ethane | 0.5 | 0.7 | 1.1 |
| propylene | 5.1 | 5.1 | 3.9 |
| propane | 1.0 | 1.1 | 1.0 |
| butylenes | 5.8 | 6.6 | 5.0 |
| isobutane | 4.2 | 2.6 | 1.9 |
| n-butane | 0.8 | 0.7 | 0.6 |
| pentenes | 3.3 | 4.0 | 2.7 |
| isopentane | 4.8 | 2.5 | 1.9 |
| n-pentane | 0.3 | 0.3 | 0.3 |
| $C_5$-435° F. gasoline | 41.0 | 32.3 | 29.4 |
| light cycle oil | 19.5 | 13.0 | 14.3 |
| heavy cycle oil | 5.6 | 13.7 | 12.3 |
| decanted oil | 0.0 | 0.0 | 0.0 |
| coke | 5.6 | 13.9 | 21.2 |
| Yield, vol. % | | | |
| propylene | 8.9 | 9.5 | 7.7 |
| propane | 1.7 | 2.1 | 2.1 |
| butylenes | 8.6 | 10.5 | 8.4 |
| isobutane | 6.8 | 4.5 | 3.4 |
| n-butane | 1.3 | 1.1 | 1.1 |
| Total $C_4$'s | 16.8 | 16.1 | 12.9 |
| $C_5$-435°F. gasoline | 61.0 | 49.7 | 46.3 |
| light cycle oil | 18.3 | 13.0 | 14.9 |
| heavy cycle oil | 4.5 | 12.0 | 11.1 |
| decanted oil | 0.0 | 0.0 | 0.0 |
| total recovery | 111.3 | 102.4 | 95.0 |

From the above description it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

Having described the invention, what is claimed is:

1. In a process for the cyclic, continuous catalytic conversion of a hydrocarbon feedstock wherein the feedstock is subjected to conversion in contact with fluidized hydrocarbon conversion catalyst particles in a reaction zone comprising a transfer line reactor, catalyst particles which are deactivated by deposits formed thereon during hydrocarbon conversion in the reaction zone are separated from the reaction zone effluent and passed to a stripping zone wherein volatile deposits formed thereon during the hydrocarbon conversion in the reaction zone are removed from the catalyst particles by contact with a stripping gas, stripped catalyst particles are separated from the stripping zone effluent and passed to a catalyst regeneration zone wherein non-volatile deposits formed thereon during the hydrocarbon conversion in the reaction zone are removed from the catalyst particles to thereby regenerate the catalyst particles and the regenerated catalyst particles are separated from the regeneration zone effluent gas and recirculated to the reaction zone; the improvement comprising:

providing a reaction vessel in the reaction zone and upstream of the transfer line reactor, and a plurality of feed inlets in the reaction zone to permit delivery of the hydrocarbon feed at one of a plurality of points spaced substantially upstream or downstream of one another in the reaction zone, at least one such point being in the reaction vessel;

passing catalyst particles from the regeneration zone and into the reaction vessel, introducing a fluidizing gas into the reaction vessel and maintaining a dense fluidized bed of the catalyst particles in the reaction vessel so as to substantially completely fill the reaction vessel with the dense fluidized bed and so that the fluidized bed has a density within the range of from 12 to about 50 pounds per cubic foot;

introducing the hydrocarbon feedstock into the reaction zone through a one of the plurality of feed inlets to thereby control the contact time of the hydrocarbon feedstock with the catalyst particles in the reaction zone and regulate the severity of the hydrocarbon conversion in the reaction zone;

passing the entire effluent from the reaction vessel into the transfer line reactor; and separating the catalyst particles from the effluent from the transfer line reactor and passing the separated catalyst particles to the stripping zone.

2. The process of claim 1 wherein the hydrocarbon feedstock is introduced through a feed inlet directly into the inlet to the transfer line reactor or through a feed inlet at a point in the reaction vessel substantially upstream of the inlet to the transfer line reactor.

3. The process of claim 1 wherein the hydrocarbon feedstock is introduced through one of a plurality of feed inlets in the reaction vessel, each such feed inlet being at substantially different distances upstream from the inlet to the transfer line reactor.

4. The process of claim 1 wherein the hydrocarbon feedstock is introduced through a feed inlet in the reaction vessel at a point substantially at the inlet to the transfer line reactor such that the feed passes substantially directly into the transfer line reactor.

5. The process of claim 1 wherein a plurality of hydrocarbon feedstocks is introduced into the reaction zone, with each hydrocarbon feedstock being introduced separately into the reaction zone through a separate one of the plurality of feed inlets, thereby separately controlling the contact time of each hydrocarbon feedstock with the catalyst particles in the reaction zone and regulating the severity of hydrocarbon conversion in the reaction zone.

6. The process of claim 5 wherein catalyst particles are introduced through at least two catalyst inlets, at least one remote from the inlet to the transfer line reactor and one substantially at the inlet to the transfer line reactor such that the majority of the catalyst particles introduced through the one catalyst inlet substantially at the inlet to the transfer line reactor passes substantially directly into the transfer line reactor.

7. The process of claim 1 wherein a hydrocarbon feed is converted in contact with fluidized hydrocarbon conversion catalyst particles in a conversion zone operated in parallel with the reaction zone, catalyst particles which are deactivated by deposits formed thereon during the hydrocarbon conversion in the conversion zone are separated from the conversion zone effluent and are passed to the stripping zone wherein volatile deposits formed thereon during the hydrocarbon conversion in the conversion zone are removed from the catalyst particles by contact with the stripping gas, stripped catalyst particles are separated from the stripping zone effluent and passed to the catalyst regeneration zone wherein non-volatile hydrocarbon deposits formed thereon during the hydrocarbon conversion in the conversion zone are removed therefrom in an oxygen-containing gas thereby regenerating the catalyst particles, the resulting catalyst particles are separated from the regeneration zone effluent gas and recirculated to the reaction zone and conversion zone and hydrocarbon effluent from the conversion zone is recovered separately from hydrocarbon effluent from the reaction zone.

8. The process of claims 1, 2, 3, 4, 5, 6 or 7 wherein the catalytic conversion comprises catalytic cracking and the hydrocarbon conversion catalyst particles comprise cracking catalyst particles.

9. The process of claim 6 wherein one hydrocarbon feedstock is a naphtha fraction.

* * * * *